(12) United States Patent
Chen et al.

(10) Patent No.: US 10,048,788 B2
(45) Date of Patent: Aug. 14, 2018

(54) TOUCH SCREEN DISPLAY UNIFORMITY

(71) Applicant: Apple Inc., Cupertino, CA (US)

(72) Inventors: Yu Cheng Chen, San Jose, CA (US);
Abbas Jamshidi-Roudbari, Sunnyvale, CA (US); Hiroshi Osawa, Sunnyvale, CA (US); Shang-Chih Lin, Los Altos, CA (US); Shih-Chang Chang, Cupertino, CA (US); Shin-Hung Yeh, Taipei (TW); Ting-Kuo Chang, Hsinchu (TW); Majid Gharghi, Mountain View, CA (US); Keitaro Yamashita, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 191 days.

(21) Appl. No.: 15/065,284

(22) Filed: Mar. 9, 2016

(65) Prior Publication Data

US 2016/0266693 A1 Sep. 15, 2016

Related U.S. Application Data

(60) Provisional application No. 62/130,542, filed on Mar. 9, 2015.

(51) Int. Cl.
*G06F 3/041* (2006.01)
*G02F 1/1333* (2006.01)
(Continued)

(52) U.S. Cl.
CPC .......... *G06F 3/0412* (2013.01); *G02F 1/1343* (2013.01); *G02F 1/13338* (2013.01); *G06F 3/044* (2013.01); *G06F 3/0418* (2013.01)

(58) Field of Classification Search
CPC ............ G06F 3/041–3/047; G06F 2203/04103
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Gene W Lee
(74) *Attorney, Agent, or Firm* — Morrison and Foerster LLP

(57) ABSTRACT

Improvement of visual uniformity of an integrated touch screen display is provided. A touch screen can include common electrodes separated by gaps in a Vcom layer. To improve visual non-uniformity in the display resulting from the gaps, a first set of semi-transparent dummy features (primary-dummy features) can be formed on a second layer at the locations of the gaps, and a second set of dummy features (supplementary-dummy features) can also be formed on the second layer or another layer to mitigate low spatial resolution of the primary-dummy features and/or non-uniform spacing of the primary-dummy features. In some examples, holes or slits can be formed in the Vcom layer at areas of the supplementary-dummy features to further improve visual uniformity.

33 Claims, 15 Drawing Sheets

(51) Int. Cl.
*G02F 1/1343* (2006.01)
*G06F 3/044* (2006.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,148,729 | B2 | 4/2012 | Kim |
| 8,279,201 | B2 | 10/2012 | Kan et al. |
| 8,479,122 | B2 | 7/2013 | Hotelling et al. |
| 8,587,559 | B2 | 11/2013 | Gandhi et al. |
| 8,847,893 | B2 | 9/2014 | Park et al. |
| 9,298,300 | B2 * | 3/2016 | Roudbari ............ G06F 3/0412 |
| 9,814,133 | B2 * | 11/2017 | Huang ................ H05K 1/0259 |
| 2006/0176285 | A1 * | 8/2006 | Lee .................... G02F 1/13338 345/173 |
| 2006/0197753 | A1 | 9/2006 | Hotelling |
| 2014/0055412 | A1 * | 2/2014 | Teramoto ............ G06F 3/0412 345/174 |
| 2014/0118277 | A1 * | 5/2014 | Kim ..................... G06F 3/044 345/173 |
| 2014/0313439 | A1 * | 10/2014 | Matsumoto .......... G06F 3/0412 349/12 |
| 2014/0327632 | A1 * | 11/2014 | Roudbari ............. G06F 3/0412 345/173 |
| 2014/0375605 | A1 * | 12/2014 | Ootani ................. G06F 3/044 345/174 |
| 2015/0077383 | A1 | 3/2015 | Kang et al. |
| 2015/0091865 | A1 * | 4/2015 | Funayama ............ G06F 3/044 345/174 |
| 2015/0309625 | A1 * | 10/2015 | Huang ................. G06F 3/0418 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

TOUCH SCREEN DISPLAY UNIFORMITY

CROSS REFERENCE TO RELATED APPLICATIONS

This application claims the benefit of U.S. Provisional Application No. 62/130,542 filed on Mar. 9, 2015, the entire disclosure of which is herein incorporated by reference for all purposes.

FIELD OF THE DISCLOSURE

This relates generally to touch sensing, and more particularly, to improving touch display uniformity of touch screens.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching near the surface may be detected near the surface without actually touching the surface.

Capacitive touch sensor panels can be formed from a matrix of drive and sense lines of a transparent or partially transparent conductive material, such as Indium Tin Oxide (ITO), often arranged in rows and columns in horizontal and vertical directions on a transparent or partially transparent substrate. It is due in part to their transparency that capacitive touch sensor panels can be overlaid on a display to form a touch screen, as described above. Some touch screens can be formed by integrating touch sensing circuitry into a display pixel stackup (i.e., the stacked material layers forming the display pixels).

SUMMARY OF THE DISCLOSURE

The following description includes examples of touch screens including circuit patterns that can improve the visual uniformity of a touch screen display. Some integrated touch screens can include a common electrode (Vcom) layer of the display system, which can be a transparent or semi-transparent conductive material deposited and segmented into electrically isolated electrodes. Electrodes can be operated as drive lines (drive electrodes), sense lines (sense electrodes), and/or guard lines (guard electrodes) of a touch sensing system. In some examples, a single Vcom segment can include a plurality of display pixels, and each display pixel can include a portion of a Vcom segment, which can be a circuit element of the display system circuitry in the display pixel stackup (i.e., the stacked material layers forming the display pixels).

The touch screen can include gaps between the Vcom segments such that touch sensing and image display can be performed by the touch screen. In some examples, the spacing between gaps in the Vcom material may not be uniform throughout a touch circuit pattern, which can make the breaks more visible in the touch circuit pattern and create non-uniformities in the appearance of the viewable display area. In some examples, a first set of "dummy" features can be disposed on a different layer than the Vcom layer (e.g., a pixel layer) such that the dummy features can occupy the area above the gaps in order to provide the appearance of a more uniform Vcom layer. In these cases, the dummy features can be disposed on a same pixel layer as other pixel stackup elements such as transistors, pixel electrodes, common voltage lines, etc.

In other examples, a second set of dummy features can be disposed on the same pixel layer. The second set of dummy features can be positioned such that the collective spacing of both the first and second sets of dummy features is uniform. This can make the dummy features less distinguishable from the Vcom layer, thus creating a touch circuit pattern that is more visually uniform. In some examples, the supplementary-dummy features can vary in length, some extending continuously along the touch screen area, and others in segments separated by gaps. In other examples, the supplementary-dummy features can be formed to have gaps along the length of the supplementary-dummy features, so as to make the supplementary-dummy features more uniform in appearance. In some examples, holes or slits can be formed in the Vcom layer at areas where supplementary-dummy features are formed so as to better match the transparency of areas where primary-dummy features are formed, thereby further improving visual uniformity.

DETAILED DESCRIPTION

In the following description of examples, reference is made to the accompanying drawings which form a part hereof, and in which it is shown by way of illustration specific examples in which examples of the disclosure can be practiced. It is to be understood that other examples can be used and structural changes can be made without departing from the scope of the examples of this disclosure.

The following description includes examples of touch screens including circuit patterns that can improve the visual uniformity of a touch screen display. Some integrated touch screens can include a common electrode (Vcom) layer of the display system, which can be a transparent or semi-transparent conductive material deposited and segmented into electrically isolated electrodes. Electrodes can be operated as drive lines (drive electrodes), sense lines (sense electrodes), and/or guard lines (guard electrodes) of a touch sensing system. In some examples, a single Vcom segment can include a plurality of display pixels, and each display pixel can include a portion of a Vcom segment, which can be a circuit element of the display system circuitry in the display pixel stackup (i.e., the stacked material layers forming the display pixels).

The touch screen can include gaps between the Vcom segments such that touch sensing and image display can be performed by the touch screen. In some examples, the location of gaps may not be uniform throughout a touch circuit pattern, which can make the breaks in conductive material more visible in the touch circuit pattern and can create non-uniformities in the appearance of the viewable display area. In some examples, "dummy" features (i.e., features which are not circuit elements in the touch circuitry) can be disposed on a different layer than the Vcom layer (e.g., a pixel layer) such that the dummy features can mask the gaps of the Vcom layer in order to provide a more uniform appearance. In these examples, the dummy features can be disposed on a same pixel layer as other display pixel stackup elements such as transistors, pixel electrodes, common voltage lines, etc. However, because the dummy features formed at the gaps can have low spatial frequency and non-uniform spacing, the touch circuit pattern can be visually apparent to a user. The following description includes examples in which non-uniformities in the visual appearance of an integrated touch screen display can be reduced.

In the examples that follow, dummy features are referred to as "primary-dummy features" representing a first set of dummy features and "supplementary-dummy features" representing a second set of dummy features. However, it is to be understood that the terms "primary-dummy" and "supplementary-dummy" are used merely for convenience in describing the dummy features in each set, and likewise should not be understood to signify any attributes of the dummy features.

Figure 1C:
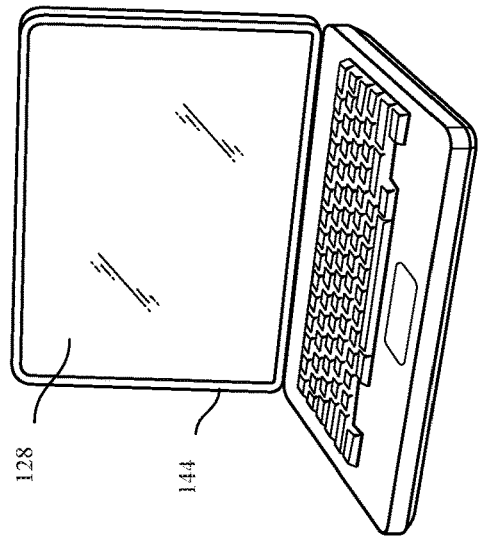
FIGS. 1A-1D illustrate an example mobile telephone, an example media player, an example personal computer, and an example display (which can be part of a touch screen) according to examples of the disclosure.
Figure 1B:
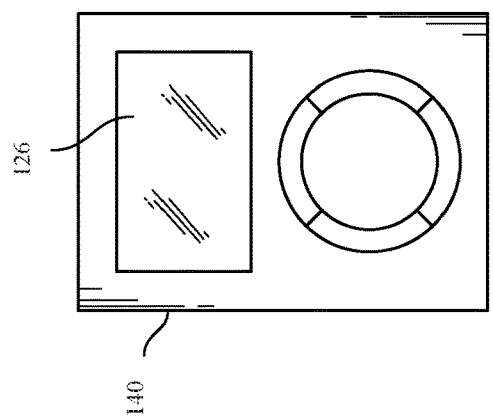
Figure 1A:
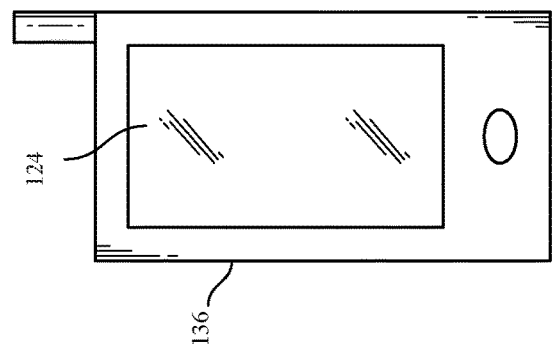
Figure 1D:
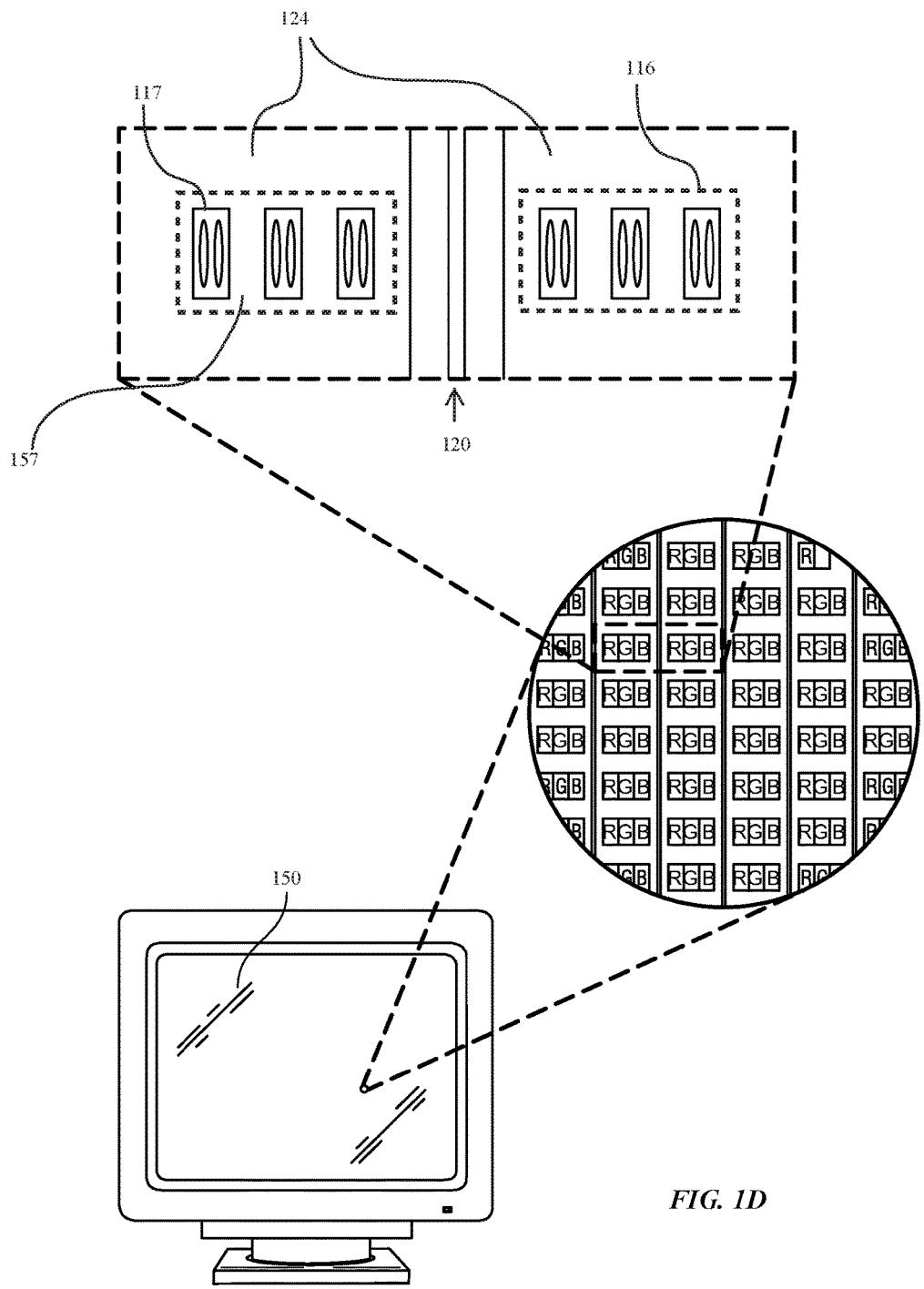

FIGS. 1A-1C show example systems in which a touch screen according to examples of the disclosure may be implemented. FIG. 1D shows an example display screen, which may be present in the touch screen of the example systems of FIGS. 1A-1C. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Touch screens 124, 126, and 128 may be based on, for example, self-capacitance or mutual capacitance, or another touch sensing technology. For example, in a self-capacitance based touch system, an individual electrode with a self-capacitance to ground can be used to form a touch pixel for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. In some examples, a self-capacitance based touch system can include a pixelated self-capacitance touch screen. Such a touch screen can include a plurality of individual touch pixel electrodes, each touch pixel electrode identifying or representing a unique location on the touch screen at which touch or proximity (i.e., a touch or proximity event) is to be sensed, and each touch pixel electrode being electrically isolated from the other touch pixel electrodes in the touch screen/panel. During operation, a touch pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen.

A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch. It is understood that while the discussion that follows focuses on mutual capacitance based touch systems, the examples of the disclosure can similarly be implemented in self capacitance based touch systems.

FIG. 1D illustrates some details of an example display screen 150. FIG. 1D includes a magnified view of display screen 150 that shows multiple display pixels 116, each of which can include multiple display sub-pixels 117, such as red (R), green (G), and blue (B) sub-pixels in an RGB display. FIG. 1D also includes a magnified view of two of the display pixels 116, which illustrates that each display pixel can include pixel electrodes 157, each of which can correspond to one of the sub-pixels 117, for example. Multiple display pixels can share a common electrode 124 that can be used in conjunction with pixel electrodes 157 to operate the display pixel, as will be described below in more detail. In this example, common electrodes can be formed on a Vcom layer, and can span multiple display pixels of the display screen, such as a single common electrode 124 spanning a rectangular or other shape area of display pixels, and gaps 120 can form openings between these larger areas of the Vcom layer to isolate one common electrode from another.

During a display operation, voltages applied to the common electrodes and to the pixel electrodes can create an electric field through a pixel material (not shown), such as liquid crystal, of each display pixel. In the case of liquid crystal, for example, the electric field can cause inclination of the liquid crystal molecules that can control the amount of light from a backlight (not shown) that passes through a transparent cover (not shown), such as color filter glass. The amount of light passing through the color filter glass can be based on an amount of inclination of the liquid crystal, which can be based on the strength of the electric field through the liquid crystal. In this way, for example, controlling the strength of voltages applied to the liquid crystal of a display pixel can control the luminance of the display pixel. Other pixel materials that can control and/or generate light based on application of voltage to the pixel material could be used, as one skilled in the art would understand.

Figure 2:
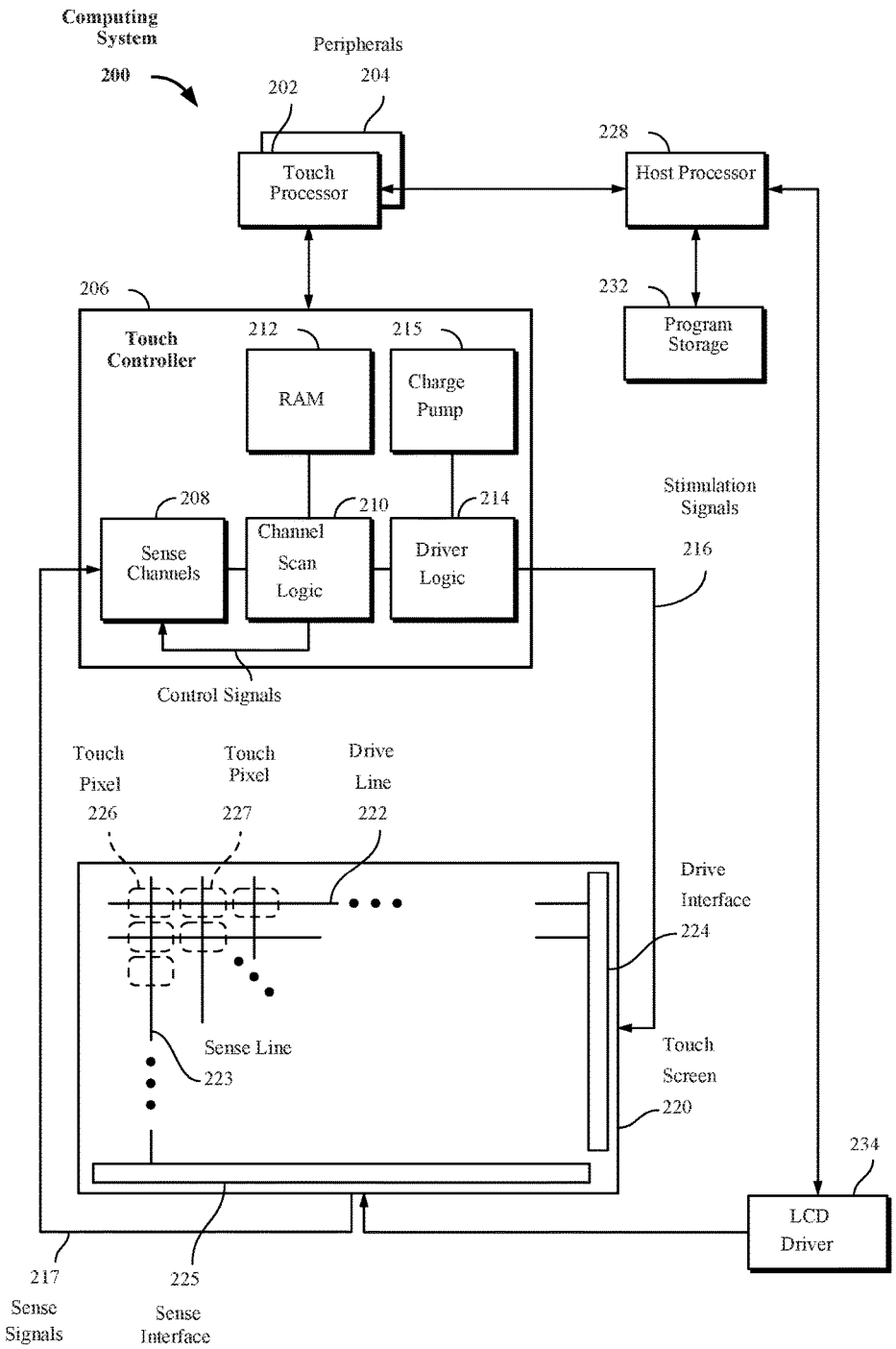
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 221 and 223. Additionally, though not shown in FIG. 2, the touch sensing circuitry of touch screen 220 can also include a plurality of guard lines 306 as described in FIG. 3B. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 221 and 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 3A:
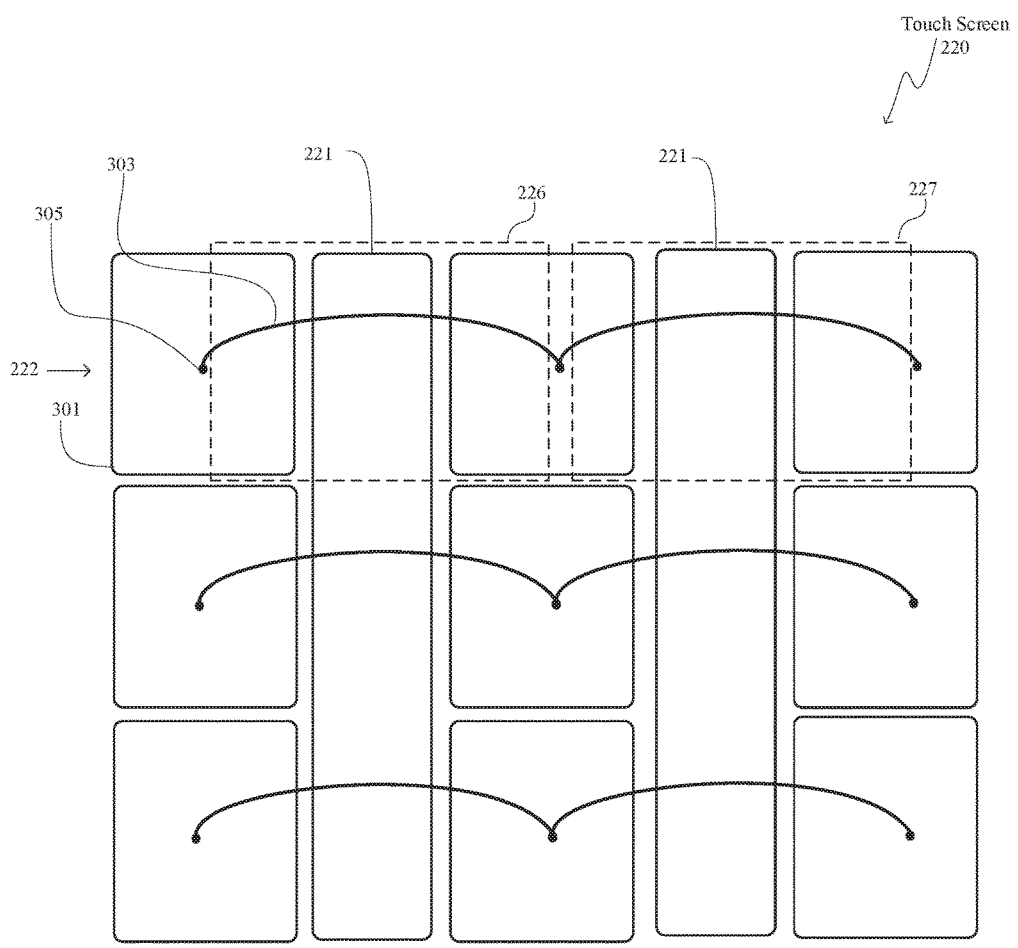
FIG. 3A is a more detailed view of the touch screen of FIG. 2 showing an example configuration of drive lines and sense lines according to examples of the disclosure.

FIG. 3A is a more detailed view of touch screen 220 showing an example configuration of drive lines 222 and sense lines 221 according to examples of the disclosure. As shown in FIG. 3A, each drive line 222 can be formed of one or more drive line segments 301 that can be electrically connected by drive line links 303 at connections 305. Drive line links 303 are not electrically connected to sense lines 221, rather, the drive line links can bypass the sense lines. Drive lines 222 and sense lines 221 can interact capacitively to form touch pixels such as touch pixels 226 and 227, shown symbolically here by rectangles having dashed lines. Drive lines 222 (i.e., drive line segments 301 and corresponding drive line links 303) and sense lines 221 can be formed of electrical circuit elements in touch screen 220. In the example configuration of FIG. 3A, each of touch pixels 226 and 227 can include a portion of one drive line segment 301, a portion of a sense line 221, and a portion of another drive line segment. For example, touch pixel 226 can include a right-half portion of a drive line segment on one side of a portion of a sense line, and a left-half portion of a drive line segment on the opposite side of portion of the sense line.

Figure 3B:
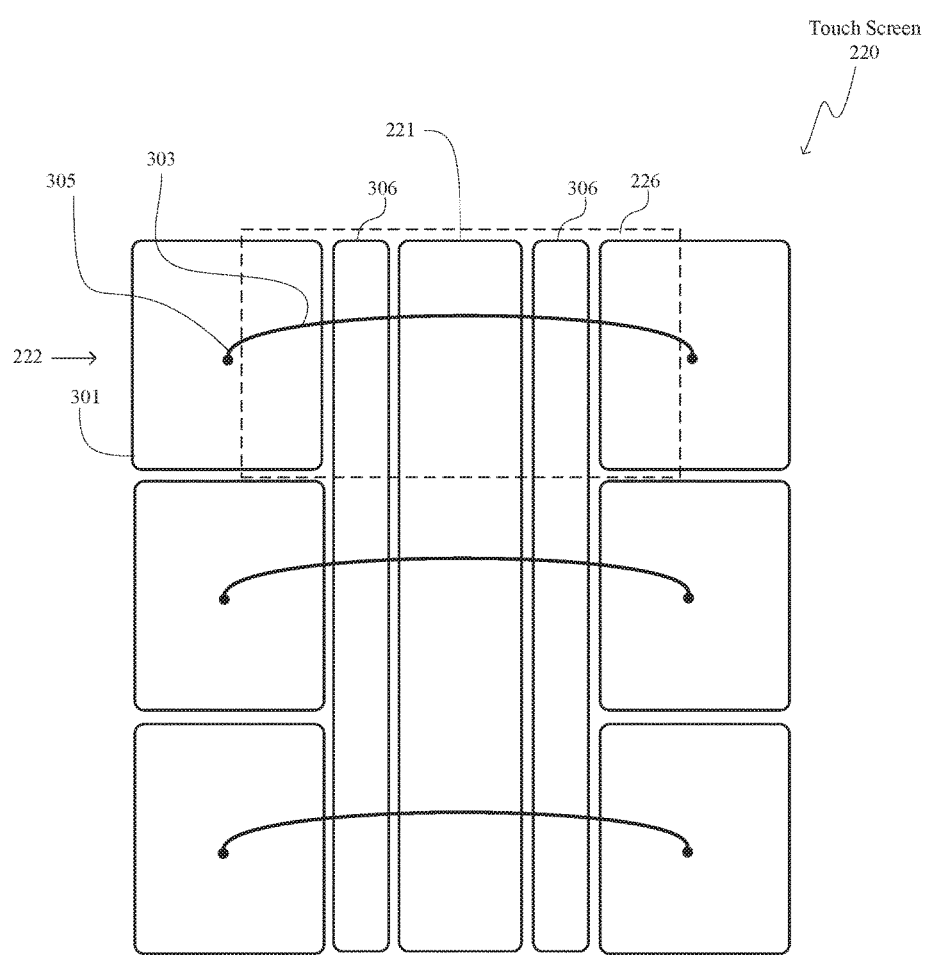
FIG. 3B is a more detailed view of the touch screen of FIG. 2 showing an alternative example configuration of drive lines, sense lines, and guard lines according to examples of the disclosure.

FIG. 3B is a more detailed view of touch screen 220 showing another example configuration of drive lines 222 and sense lines 221 according to examples of the disclosure. As shown in FIG. 3B, in addition to drive lines 222 and sense line 221, touch screen 220 can further include guard lines 306 to improve the touch event detection capabilities of the touch screen 220. Guard lines 306 can act to reduce direct capacitive coupling that may occur between drive line segments 301 and sense line 221, so as to increase the sensitivity of touch pixel 226 to the absence or presence of a touch at touch pixel 226, as will be explained in more detail with reference to FIG. 6 below. Each guard line 306 can be formed of electrical circuit elements in touch screen 220. In the example configuration of FIG. 3B, each of the touch pixels (e.g., touch pixel 226) can include a portion of one drive line segment 301, a portion of a first guard line 306, a portion of a sense line 223, a portion of a second guard line 306, and a portion of another drive line segment 301. The circuit elements forming the drive lines 222, sense lines 221 and guard lines 306 can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. For simplicity, only a few examples of the circuit elements are described in the configurations shown in FIGS. 3A-3B. It should be understood that systems may include many more circuit elements in other possible configurations, including different shapes and arrangements of electrodes and drive line links. Moreover, in some configurations (not shown) drive lines may be formed of a solid electrode, while sense lines are formed of a series of connected electrodes similar to the drive lines as explained above with reference to FIGS. 3A-3B.

Figure 4:
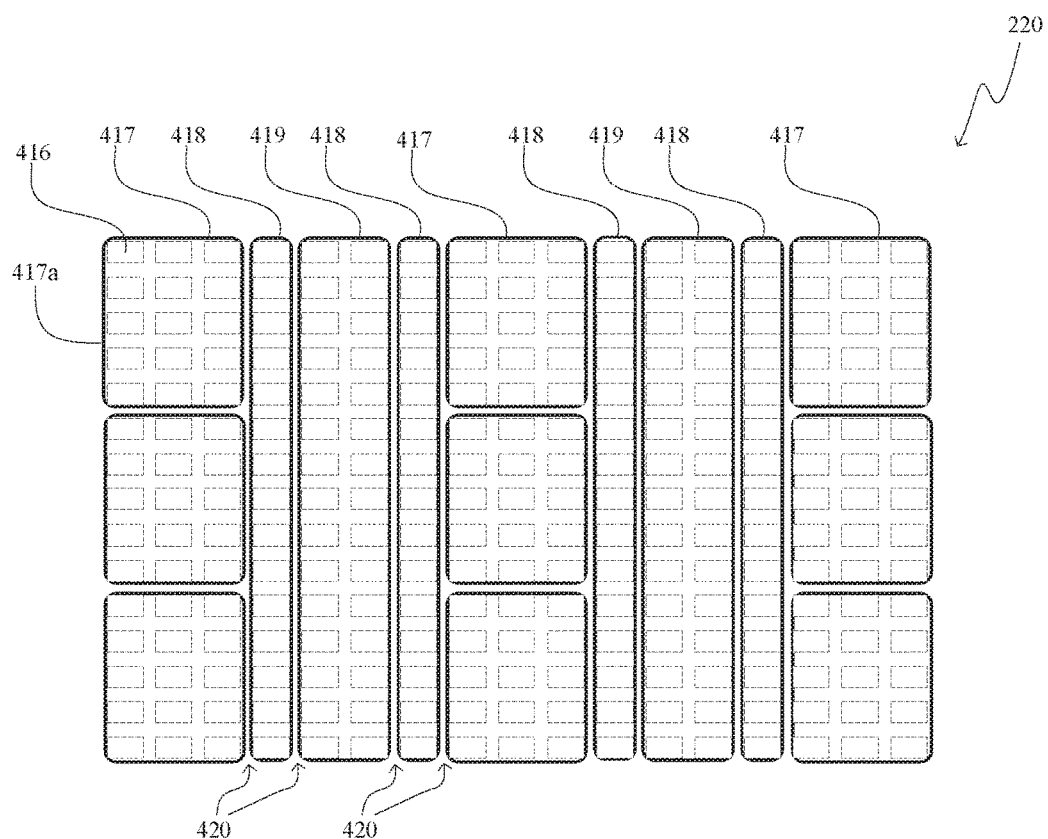
FIG. 4 illustrates an example configuration of an integrated touch screen according to examples of the disclosure.
Figure 5:
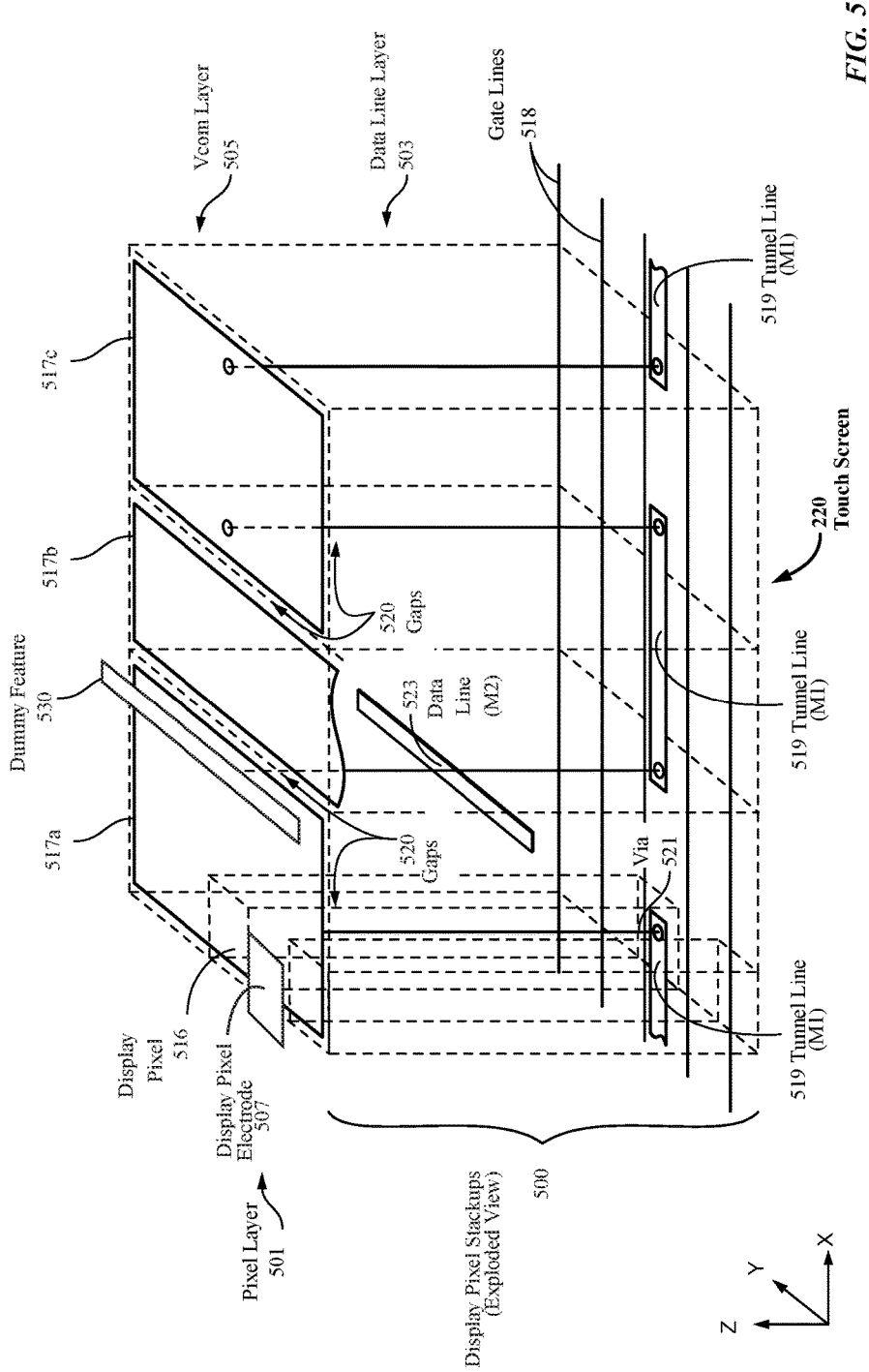
FIG. 5 illustrates an exploded view of example display pixel stackups according to examples of the disclosure.

Referring to FIGS. 4-5, an example integrated touch screen configuration in which common electrodes (Vcom) can form portions of the touch sensing circuitry of a touch sensing system will now be described. In some examples, common electrodes can be circuit elements of the display system circuitry in the display pixel stackup (i.e., the stacked material layers forming the display pixels). In some types of LCD displays, common electrodes can operate as part of the display system to display an image. FIG. 4 illustrates a simplified plan view of a portion of an example touch screen, and FIG. 5 is a three-dimensional exploded view showing further details of an example display pixel stackup according to examples of the disclosure.

As illustrated in the example of FIG. 4, each sense line can be formed of a single common electrode 419 (also referred to as sense electrode) on the Vcom layer. Each drive line can be formed of multiple drive line segments, which can each be formed of a common electrode 417 (also referred to as drive electrode), and each guard line segment can be formed of a single common electrode 418 (also referred to as guard electrode). As shown, each single common electrode can span multiple display pixels 416 (shown symbolically as rectangles of dashed lines). For example, a first drive line segment 417a can be formed of a single common electrode that is shared by multiple display pixels 416. Each single common electrode can be separated from other common electrodes by gaps 420 in the Vcom layer, which can be physical gaps between common electrodes. Thus, the drive electrode 417 of the drive lines can be conductively isolated from the sense electrode 419 of the sense lines and guard electrode 418 of the guard lines. In other words, an electrical open can exist between the drive lines, guard lines and sense lines. Likewise, the drive electrode 417 of each drive line can be conductively isolated from the drive electrode 417 of the other drive lines. Although the examples discussed herein generally follow the configuration shown in FIG. 4, other configurations are contemplated within the scope of this disclosure. For example, the drive and sense regions are not limited to the shapes, orientations, and positions shown, but can include any suitable configurations according to examples of the disclosure.

FIG. 5 is a simplified three-dimensional illustration of an exploded view (expanded in the z-direction) of example display pixel stackups 500 showing some of the elements within the display pixel stackups of example integrated touch screen 220 according to examples of the disclosure. Stackups 500 can include elements in a first layer (e.g., "data line layer") 503, a second common electrode layer (e.g., Vcom layer) 505, and a third layer (e.g., "pixel layer") 501. The data line layer 503 can include data lines 523. The Vcom layer 505 can include common electrodes, such as those making up the drive lines 222 and sense lines 221 shown in FIGS. 3A-3B. The pixel layer can include display pixel electrodes, such as display pixel electrode 506 shown. As shown, tunnel lines (also referred to as bypass lines) 519 can electrically connect together drive line segments of a drive line. These tunnel lines 519 can correspond, for example, to the drive line links 303 shown in FIGS. 3A-3B.

Structures such as display pixel electrodes 506, along with other pixel stackup elements such as transistors, common voltage lines, etc. (not shown), can operate as display circuitry of a display system to display an image on the touch screen during a display phase. Structures such as the drive electrodes 517a and 517c and the sense electrode 517b can operate as multifunction circuit elements that can operate as part of both the touch sensing system and the display system. For example, drive electrodes 517a or 517c and sense electrode 517b can respectively operate as a drive line and sense line in the touch sensing system, and both can operate as a common electrode for a different display pixel in the display system. Additionally, though not shown in FIG. 5, display pixel stackups 500 can also include guard electrodes, as described in FIGS. 3B and 4, which can operate as guard lines as part of the touch sensing system during a touch sensing phase of the touch screen, and can operate as a common electrode for display pixels in the display system during a display phase of the touch screen. Also shown in FIG. 5 is an example dummy feature 530 also formed in the pixel layer 501, the configuration and function of which will be described in more detail below.

Figure 6:
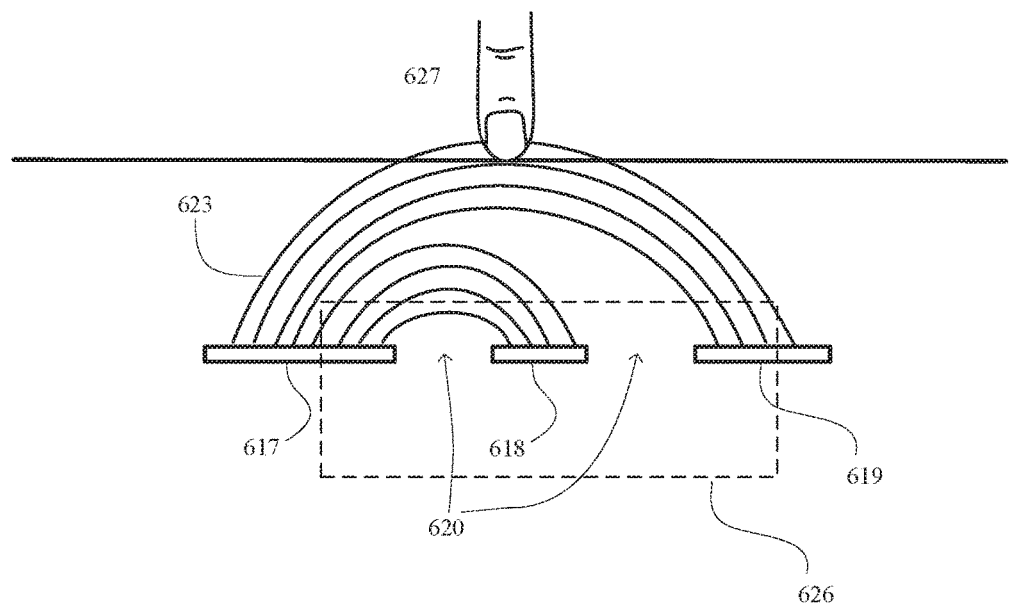
FIG. 6 illustrates an example touch sensing operation according to examples of the disclosure.

An example touch-sensing operation will now be discussed with reference to FIG. 6. FIG. 6 illustrates a simplified example touch screen (e.g., touch screen 220) with a drive electrode 617, sense electrode 619, and guard electrode 618, together forming a touch pixel 626, similar to the example configurations shown in FIG. 3B and FIG. 4 according to examples of the disclosure. As shown, each electrode can be formed on a same layer and separated by gaps 620. As discussed above with reference to FIG. 2, during a touch sensing phase, stimulation signals (also referred to as drive signals) can be transmitted through a drive line to form electric fields between the stimulated drive line segments (e.g., drive electrode 617) and the sense lines (e.g., sense electrode 619) to create touch pixels, such as touch pixel 626 shown in FIG. 6, which can correspond, for example, to touch pixel 226 in FIG. 2. When an object such as a finger 627 approaches or touches touch pixel 626, the object can affect electric fields 623 extending between the drive electrode 617 and sense electrode 619, thereby reducing the amount of charge capacitively coupled to sense electrode 619. This reduction in charge coupled to sense electrode 619 can be sensed by a sense channel of a touch sensing controller connected to sense electrode 619, such as touch controller 206 shown in FIG. 2, and stored in a memory along with similar information of other touch pixels to create an "image" of touch.

As shown in FIG. 6, the field lines emitted by drive electrode 617 can include both near (within the touch screen surface) and far field (outside of the touch screen surface) lines. It can be beneficial to minimize the amount of charge coupled to sense electrode 619 that is unaffected by the finger 627 (i.e., near field lines), and instead utilize as much as possible the charge that is affected by the finger 627 (i.e., far field lines) to detect touch. Accordingly, in some examples, guard electrode 618 can be coupled to ground in order to shunt most near field lines directly to ground, leaving mostly far field lines affected by the approaching finger 627.

Figure 7A:
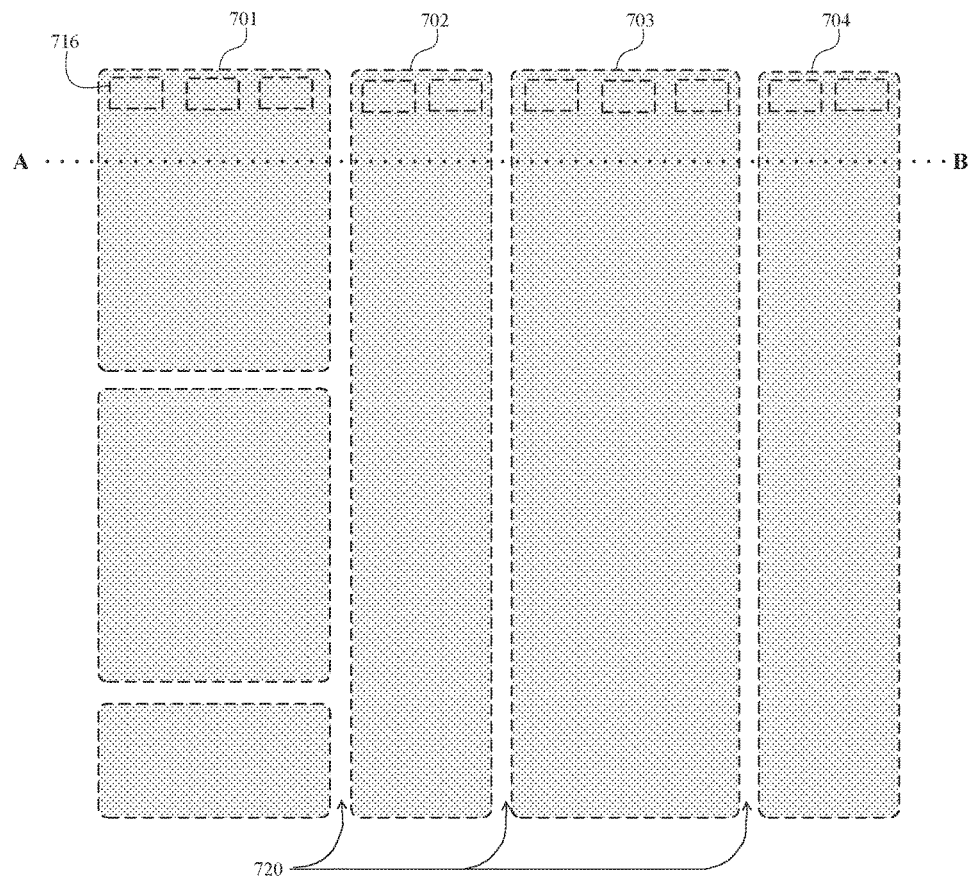
FIGS. 7A-7B illustrate a portion of a conductive common electrode layer (Vcom layer) of an example configuration of a touch screen according to examples of the disclosure.
Figure 7B:
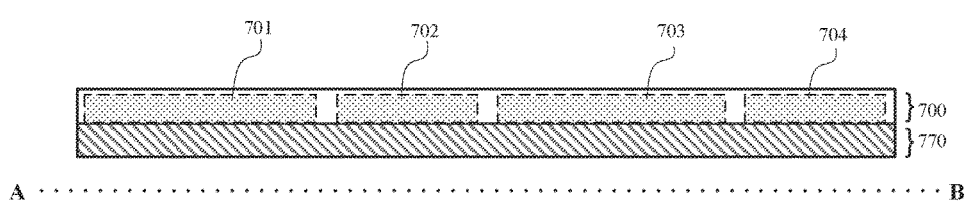

FIGS. 7A-7B illustrate a portion of a Vcom layer 700 in an example configuration of touch screen 220 according to examples of the disclosure. FIG. 7A illustrates a plan view of the Vcom layer 700, and FIG. 7B illustrates a cross-sectional illustration of the configuration shown in FIG. 7A across line A-B, as shown. As discussed, Vcom layer 700 can be formed of a conductive material. As shown, the Vcom layer 700 can be segmented into portions, separated by gaps 720. FIG. 7A illustrates a drive electrode 701, sense electrode 703, and guard electrodes 702, 704, which can be operated as drive lines, sense lines, and/or guard lines respectively. Each of the gaps 720 between electrodes 701-704 can extend along the length of touch screen 220 parallel to sense lines 223, which can correspond, for example, to sense electrode 703 in FIGS. 7A-7B. It should be understood that in some examples, the gaps can additionally or alternatively extend horizontally, depending on the touch circuit layout. Gaps 720 are illustrated in FIGS. 7A-7B as each having equal width, though it is to be understood that the width may vary between gaps in other examples. Additionally, it is to be understood that the drive and sense regions are not limited to the shapes, orientations, and positions shown in FIGS. 7A-7B, but can include any suitable configurations according to examples of the disclosure.

Portions of the Vcom layer 700 can also operate as circuit elements in the display circuitry of touch screen 220. Specifically, as also mentioned above with reference to FIG. 4, electrodes 701-704 can operate as a common electrode to one or more display pixels 716. For example, in the configuration of FIG. 7A, drive electrode 701 can be shared by multiple display pixels 716 as a common electrode (though, for simplicity, only one row of display pixels 716 is shown). Display pixels 716 are illustrated with dashed lines to signify that the individual circuit elements of display pixels formed on the Vcom layer 700 may not be discernable on the Vcom layer itself (for example, if a plurality of display pixels were to share a single Vcom portion as a common electrode). It is to be understood that the display pixels arranged within the Vcom portions are not limited to the shapes and arrangements shown, but can be of any suitable size, shape or arrangement to permit display and touch capabilities according to examples of the disclosure.

Vcom layer 700, including electrodes 701-704, can be formed by patterning a semi-transparent conductive material such as an ITO material onto a substrate 770, shown in FIG. 7B. In general, this is accomplished by depositing an ITO layer over the substrate surface, and then etching away portions of the ITO layer in order to form the conductive segments. As should be appreciated, areas with ITO tend to have lower transparency than areas without ITO. For example, in the configuration shown in FIG. 7B, the areas of electrodes 701-704 can have lower transparency than the areas of gaps 720. As the pattern of Vcom layer 700 forming the electrodes can extend horizontally and vertically along the viewable display of the touch screen in a repeated pattern, variations or non-uniformities in the ITO pattern may be visible to a touch screen user. Thus, the configuration of FIG. 7A can be less desirable from a visual standpoint, as a touch screen user may visually discern the touch circuit pattern by distinguishing ITO segments (e.g., electrodes 701-704) from the spaces therebetween (e.g., gaps 720).

Depending on the width of the Vcom electrodes 701-704, there can be relatively large horizontal spacing between each of the gaps 720; that is, the gaps can have a low spatial resolution. For example, in the example configuration of FIG. 7A, some gaps 720 are separated by three display pixels. Moreover, as shown in FIG. 7A, the horizontal spacing of gaps 720 can be non-uniform. For example, some gaps 720 are separated by two display pixels, whereas gap others are separated by three display pixels. It should be appreciated that low spatial resolution of gaps 720 and non-uniform spacing between gaps 720 can exacerbate the visibility of the touch circuit pattern to the touch screen user, particularly when the spacing is repeated and/or extended to fill the touch screen display area.

Figure 8A:
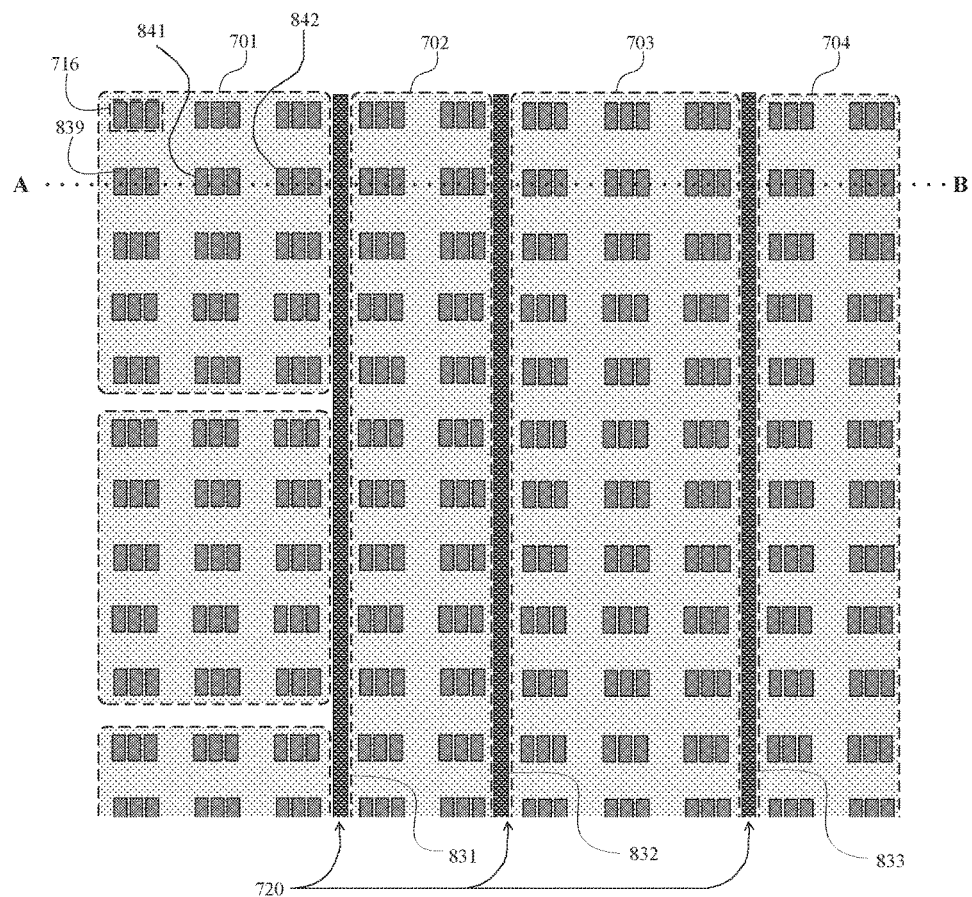
FIGS. 8A-8B illustrate an example pixel conductive layer (pixel layer) of the example configuration of FIGS. 7A-7B according to examples of the disclosure.
Figure 8B:
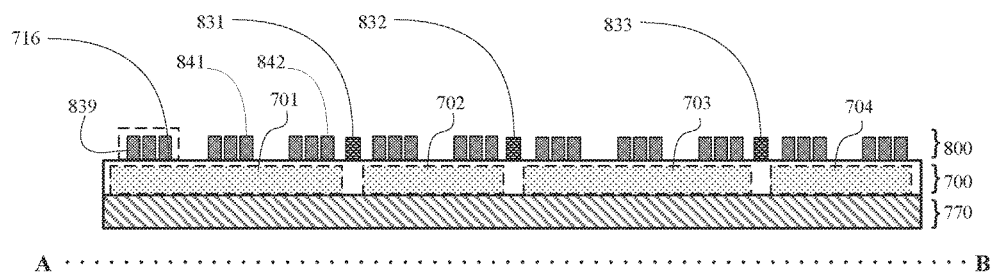

In order to mitigate the abovementioned problem, it can be beneficial to deposit a second semi-transparent conductive material at one or more gaps 720. FIGS. 8A-8B illustrates an example of such a configuration.

FIGS. 8A-8B illustrates a conductive layer (pixel layer 800) separate from Vcom layer 700 of the example configuration of FIG. 7, wherein a first set of "dummy" features, hereinafter referred to as primary-dummy features 831-833, are formed at gaps 720 present on the Vcom layer 700 according to examples of the disclosure. FIG. 8A illustrates a plan view of the pixel layer 800, and FIG. 8B illustrates a symbolic cross-sectional illustration of the configuration shown in FIG. 8A across line A-B, as shown. Pixel layer 800 as illustrated in FIG. 8B can be formed by patterning a second semi-transparent conductive material, such as an ITO material over Vcom layer 700. In other examples (not shown) the pixel layer 800 may be deposited on an additional substrate above or below the Vcom layer 700. For convenience, this second ITO material is hereinafter referred to as ITO2 so as to distinguish it from the ITO material in the Vcom layer illustrated in FIGS. 7A-7B; however, it is understood that ITO and ITO2 may be of the same or different transparent or semi-transparent conductive material type. In addition, although some examples are described herein as being formed on a "pixel layer," it is to be understood that in other examples, this layer may include any circuit element of the touch screen circuitry or display circuitry that are not formed on the Vcom layer, including examples wherein no pixel elements are formed. In other words, ITO2 can be formed in a layer different from the Vcom layer.

For clarity, electrodes 701-704 are illustrated in FIGS. 8A-8B with dashed lines to signify that these Vcom portions are formed on the Vcom layer 700, which is separate from the pixel layer 800.

In the configuration shown in FIGS. 8A-8B, primary-dummy features 831-833 can be formed from ITO2 at the gaps 720 between the electrodes 701-704. In such a configuration, the primary-dummy features 831-833 can give the appearance of a more complete touch circuit pattern by overlapping with the missing ITO at gaps 720. As a result, the touch circuit pattern formed on the Vcom layer can appear more visually uniform, and consequently less visible to a touch screen user. In some examples, the ITO2 material that forms primary-dummy features 831-833 can be of the same material as the ITO that forms the Vcom layer in order to provide the best optical index matching to the ITO. In other examples, index matching materials may be applied to the ITO2 to better match the optical index of the ITO. Primary-dummy features 831-833 are preferably of the same width as gaps 720; however, in other examples, primary-dummy features 831-833 can be slightly wider or narrower than the gaps 720 and still improve visual uniformity of the touch circuit pattern. As with gaps 720, primary-dummy features 831-833 can extend continuously along the vertical length of the touch screen.

In addition to primary-dummy features 831-833, the pixel layer 800 can also include circuit elements of the display system circuitry. FIGS. 8A-8B illustrates a plurality of pixel elements 839, which can be formed of ITO2. In some examples, pixel elements 839 can correspond to circuit elements of display pixels 716, including circuit elements of sub-pixels of display pixels as shown in FIG. 1D. For example, pixel elements 839 can include transistors, pixel electrodes, common voltage lines, etc. For simplicity of illustration, pixel elements 839 are represented as rectangular shapes; however, it is understood that each pixel element 839 may comprise a range of shapes varying in size, density, and complexity. The location of one of the display pixels 716 is indicated with dashed lines to signify the correspondence between pixel elements 839 and display pixels 716, though it is understood that this correspondence can apply to any of the touch pixel elements 839. Conversely, it is understood that in other examples, additional circuit elements not shown in FIGS. 8A-8B can be present in the pixel layer, and these additional circuit elements may or may not correspond to display pixels 716.

In some examples, primary-dummy features can be configured as to minimize interference with touch sensing and display operations. For example, referring back to FIG. 6, it can be advantageous to minimize interference with the operation of drive, sense, and/or guard electrodes (e.g., 617, 618, and 619). Therefore, in some examples, effects from capacitive coupling can reduced by coupling primary-dummy features 831-833 to the Vcom layer 700, or alternatively, to ground. In some examples, one or more of the primary-dummy features can be electrically floating. In some examples, primary-dummy features 831-833 can be electrically isolated from one another and separately coupled to a common voltage (Vcom) or ground in an area outside of the display area of the touch screen 220. In other examples, the primary-dummy features 831-833 may be coupled together in an area outside of the display area of the touch screen 220, and jointly connected to Vcom or ground. It is understood that, although primary-dummy features 831-833 may share the same attribute of being formed at gaps 720, individual primary-dummy features 831-833 may have different attributes in terms of sizing and coupling. For example, primary-dummy feature 831 formed between drive electrode 701 and guard electrode 702 may be coupled differently than primary-dummy feature 832 formed at gap 720 between guard electrode 703 and sense electrode 719.

Although the primary-dummy features 831-833 shown in FIGS. 8A-8B can improve the non-uniformities in the appearance of the viewable display area of the touch screen, this configuration is subject to two general limitations. First, even in configurations where primary-dummy features 831-833 are formed to overlap with gaps 720, the primary-dummy features 831-833 themselves may be visible. For example, it can be difficult to achieve optical indistinguishability between dummy features formed on the pixel layer 800, and the Vcom portions (e.g., common electrodes) formed on the Vcom layer 700. This can be especially difficult if the ITO2 material, which forms the pixel layer 800, is a different than the ITO material forming the Vcom layer 700. Furthermore, as similarly discussed above with reference to gaps 720, the primary-dummy features 831-833 can be more distinguishable if the dummy features have low spatial resolution and/or if the horizontal spacing of the dummy features is non-uniform. Second, precise manufacturing process control can be required to ensure that pixel elements are formed uniformly throughout the pixel layer. In some examples, without precise process controls, pixel elements in areas with high pattern density can be formed differently than pixel elements in areas with low pattern density. For example, in the configuration of FIGS. 8A-8B, pixel element 841 may be formed slightly differently than pixel element 842, which is formed near primary-dummy feature 831. In these examples, even if the dummy features themselves are not visible in the touch circuit pattern, the slight variations between pixel elements 842 can cause visual artifacts in the display of the touch screen 220.

Figure 9A:
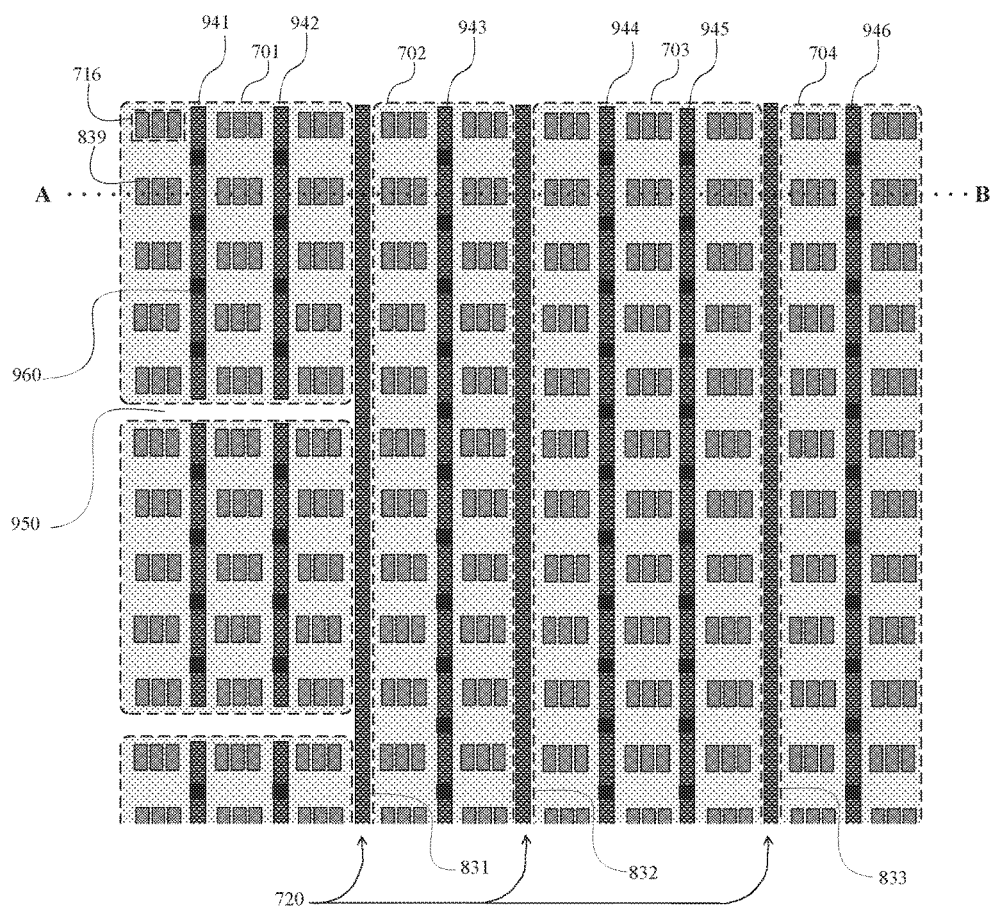
FIGS. 9A-9D illustrate example pixel layers of the example configuration of FIGS. 7A-7B incorporating a second set of dummy features according to examples of the disclosure.
Figure 9B:
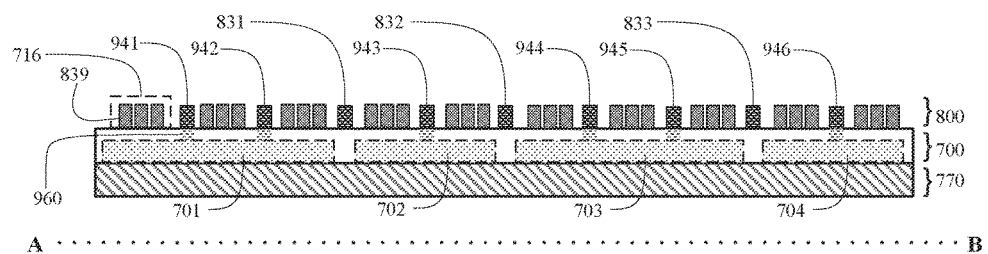
Figure 10:
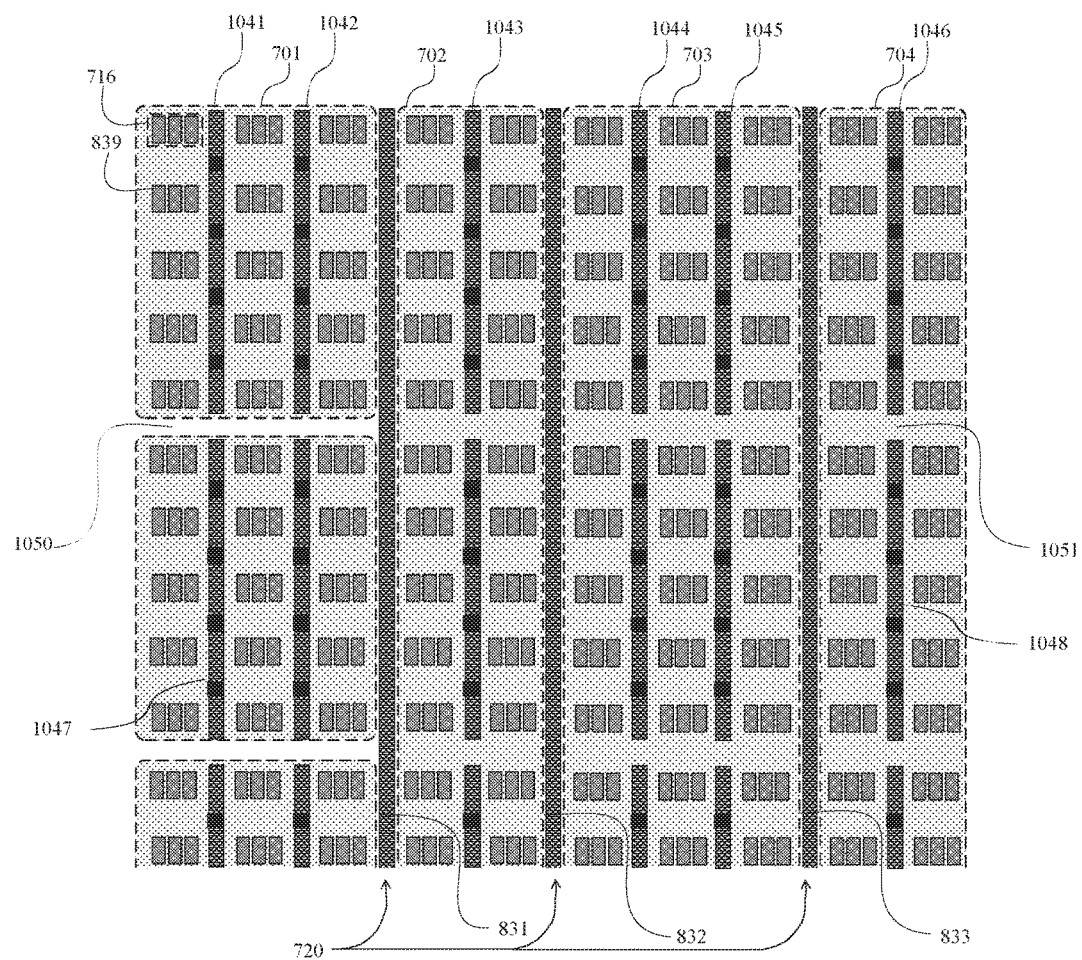
FIG. 10 illustrates another example pixel layer of the example configuration of FIGS. 7A-7B incorporating a second set of dummy features according to examples of the disclosure.

To mitigate the abovementioned limitations of the configuration of FIGS. 8A-8B, additional dummy features can be formed on the pixel layer 800. FIGS. 9A-9B and FIG. 10 illustrate examples of such configurations.

FIGS. 9A-9B illustrates a pixel layer 900 of the example configuration of FIG. 7, which incorporates primary-dummy features 831-833 of FIGS. 8A-8B and a second set of dummy features, hereinafter referred to as supplementary-dummy features 941-946 according to examples of the disclosure. FIG. 9A illustrates a plan view of the pixel layer 900, and FIG. 9B illustrates a symbolic cross-sectional illustration of the configuration shown in FIG. 9A across line A-B, as shown. As in FIGS. 8A-8B, common electrodes 701-704 are illustrated in FIG. 9A with dashed lines to signify that these portions are formed on the Vcom layer 700, which is separate from the pixel layer 900. Moreover, the rectangular depiction of pixel elements 839 is only for simplicity of illustration, and display pixels 716 can extend throughout the touch circuit pattern beyond the single display pixel 716 shown.

As illustrated in FIG. 9A, supplementary-dummy features 941-946 can be formed of ITO2 at areas other than the gaps 720. In some examples, supplementary-dummy features 941-946 can be arranged on the pixel layer 900 such that the supplementary-dummy features 941-946 and primary-dummy features 831-833 are collectively spaced uniformly throughout the touch pattern in a horizontal direction. In some examples, supplementary-dummy features can be formed over common electrodes in order to make the spacing of dummy features uniform. For example, as shown in FIGS. 9A-9B, primary-dummy features 831 and 832 are separated by two display pixels 716, while primary-dummy features 832 and 833 are separated by three display pixels 716. To mitigate this non-uniform spacing, supplementary-dummy features 941-946 can be formed such that the supplementary-dummy features and primary-dummy features 831-833 are collectively spaced in a first direction with one display pixel 716 between each feature. In other words, all of the dummy features are collectively spaced in a first direction.

It should be understood that the placement of supplementary-dummy features 941-946 is not limited to the example shown in FIGS. 9A-9B (i.e., placed such that one display pixel 916 is between each dummy feature), but can be any arrangement in which the supplementary-dummy features 941-946 and primary-dummy features 831-833 are collectively spaced in a direction (e.g., horizontally) with uniformity (one skilled in the art would understand that uniformity includes spacing within a 20% tolerance).

Figure 9C:
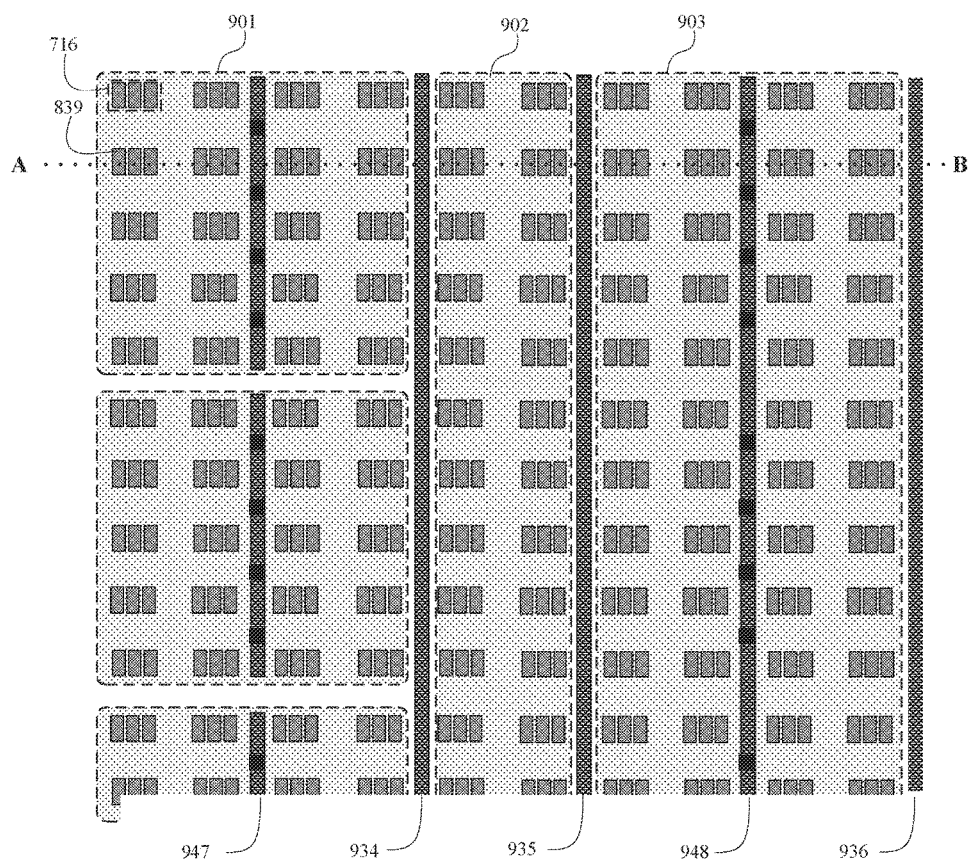
Figure 9D:
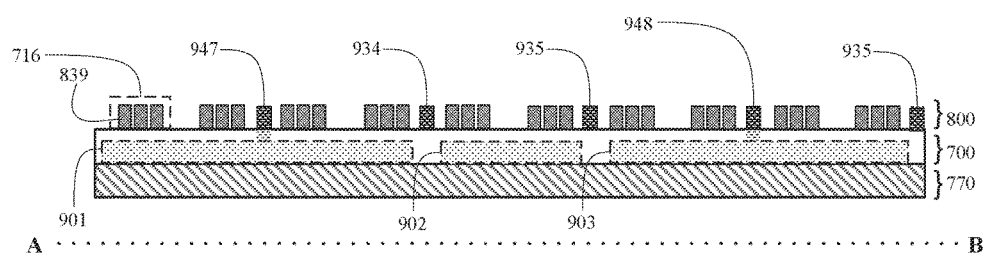

FIGS. 9C-9D show another example configuration wherein primary-dummy features 934-935 are non-uniformly spaced such that two display pixels 716 are between primary-dummy features 934 and 935, and four display pixels 716 are between primary-dummy features 935 and 936 according to examples of the disclosure. In this example, the non-uniform spacing can be corrected by positioning supplementary-dummy features 941-946 such that, collectively, the primary-dummy features 934-935 and supplementary-dummy features 941-946 are uniformly spaced with two display pixels between each feature. In other words, all of the dummy features are uniformly spaced.

In addition to correcting non-uniformity, supplementary-dummy features 941-946 can be formed on the pixel layer 900 in order to increase the spatial frequency of primary-dummy features 831-833. For example, though not shown in the configuration of FIGS. 9C-9D, additional supplementary-dummy features 941-946 could be formed on the pixel layer such that the collective spacing between each dummy feature 831-833 or supplementary-dummy feature 941-946 is one display pixel, even if a spacing of two display pixels is sufficient to achieve uniform spacing between dummy features. In some examples, like those illustrated in FIGS. 9A-9D, supplementary-dummy features can be positioned between structures such as display pixels 716. However, in other examples, some supplementary-dummy features may overlay structures such as the display pixels 716 in order to create uniform horizontal spacing between features. For example, supplementary-dummy features 941-946 can be positioned between sub-pixels within display pixels 716. Moreover, although these examples above describe the supplementary-dummy features 941-946 as being formed on the pixel layer 900, it is to be understood that in other examples, the supplementary-dummy features 941-946 can be formed on a separate layer above the Vcom layer 700, positioned either above or below the pixel layer 900.

It should be appreciated that, to the extent that dummy features are visible in the touch circuit pattern, increasing the spatial frequency of the dummy features and correcting non-uniform spacing can give the appearance of a more visually uniform touch circuit pattern, which can be consequently much less noticeable to a touch screen user. Likewise, by making the pattern density more uniform throughout the pixel layer, visual artifacts in the touch screen can be corrected, which would otherwise require a high degree of manufacturing process control to mitigate. In some examples, in order to reduce the distinguishability between primary-dummy features 831-833 and supplementary-dummy features 941-946, the width of supplementary-dummy features can match the width of the primary-dummy features 831-833; however, in other examples the width of supplementary-dummy features may be slightly larger or smaller than primary-dummy features 831-833 in order to account for differences in material, etc. One skilled in the art would understand that "matching" widths include widths within a 20% tolerance of one another.

In some examples, supplementary-dummy features 941-946 can be coupled to the Vcom layer 700 via one or more Vcom contact points 960. As shown in FIG. 9A, contact points 960 can be positioned over common electrodes 701-704 such that each contact point 960 couples a supplementary-dummy feature to its corresponding electrode. In some examples, one or more supplementary-dummy features may be electrically floating. In the configuration of FIG. 9A, the lengths of supplementary-dummy features 941-946 can vary depending on which electrode 701-704 each supplementary-dummy feature is coupled to. For example, supplementary-dummy feature 943 can be coupled to guard electrode 702 along the length of guard electrode 702, which can vertically extend along the length of the touch screen 220. In contrast, supplementary-dummy feature 941 can be coupled along the length of drive electrode 702, but may not continuously extend along the length of the touch screen 220. Accordingly, in some examples, some supplementary-dummy features 941-946 can have gaps 950 vertically separating one or more supplementary-dummy features, while other supplementary-dummy features 941-946 can extend continuously along the length of the touch screen 220. In examples where one or more supplementary-dummy features extend continuously to an edge of the touch screen (for example, supplementary-dummy feature 943 in FIG. 9A), these continuously extending supplementary-dummy features can alternatively be coupled to the Vcom layer 700 in an area outside of the display area of the touch screen 220, rather than being coupled at respective Vcom portions 720 via contact points 960.

FIG. 10 is another example of a pixel layer 1000, which incorporates primary-dummy features 831-833 of FIGS. 8A-8B and supplementary-dummy features 1041-1047 according to examples of the disclosure. The configuration of FIG. 10 is substantially the same as that illustrated in FIG. 9A; however, unlike the configuration in FIG. 9A, a gap 1051 can be formed between each of the supplementary-dummy features 1041-1047, even if the gap does not correspond to a gap in Vcom (e.g., gap 1050). For example, similar to the configuration in FIG. 9A, supplementary-dummy feature 1041 can be separated from supplementary-dummy feature 1047 by a gap 1050, the gap between supplementary-dummy features corresponding to a gap between drive electrode portions. However, unlike in FIG. 9A, supplementary-dummy feature 1046 can also be separated from supplementary-dummy feature 1048 by a gap 1051, despite a lack of corresponding gap in Vcom layer 700. Thus, in some examples, supplementary-dummy features coupled to drive electrodes and supplementary-dummy features coupled to sense electrodes or guard electrodes can be formed to have equal lengths in a direction (one skilled in the art would understand equal lengths to include lengths that are within a 20% tolerance of one another). In some examples, the supplementary-dummy features can be formed such that they are aligned vertically as shown in FIG. 10. It is to be understood that the configuration in FIG. 10 can make supplementary-dummy features 1041-1047 less distinguishable from one another, which can give the appearance of a more visually uniform touch circuit pattern. Although examples illustrated in FIG. 10 relate to creating gaps between supplementary-dummy features to match gaps 1050 necessitated by gaps in Vcom, it is to be understood that the supplementary-dummy features can have gaps formed for any reason useful to make the touch circuit pattern more visually uniform. For example, gaps in supplementary-dummy features repeated horizontally as pictured in FIG. 10 may be introduced in the circuit pattern to offset the appearance of a horizontal line in the touch circuitry pattern. Moreover, though not shown, in other examples primary-dummy features 831-833 may also include one or more gaps to provide a more uniform pattern.

As set forth above, to improve visual non-uniformity in the display resulting from gaps between Vcom segments, primary-dummy features can be formed on a second layer at locations of the gaps, and supplementary-dummy features can also be formed on the second layer at areas of the Vcom segments. As both primary-dummy and supplementary-dummy features can be formed of a semi-transparent material, areas with two layers of material (e.g., areas with supplementary-dummy features and Vcom portions) can be less transparent than areas with one layer of material (e.g., an area with primary-dummy features formed over gaps between Vcom segments). For example, referring back to FIG. 9A-9B, a first area where supplementary-dummy feature 941 is formed over Vcom segment 701 can be less transparent than a second area where primary-dummy feature 932 is formed over one of the gaps 720 between Vcom segments. In some cases, this possible difference in transparency can create non-uniformity across the display. Therefore, in some examples, in order to further improve visual non-uniformity, it can be beneficial to form Vcom layer as to have holes (e.g., slits) at locations where supplementary-dummy features are formed, as will be explained further with reference to FIGS. 11A-11D below.

Figure 11A:
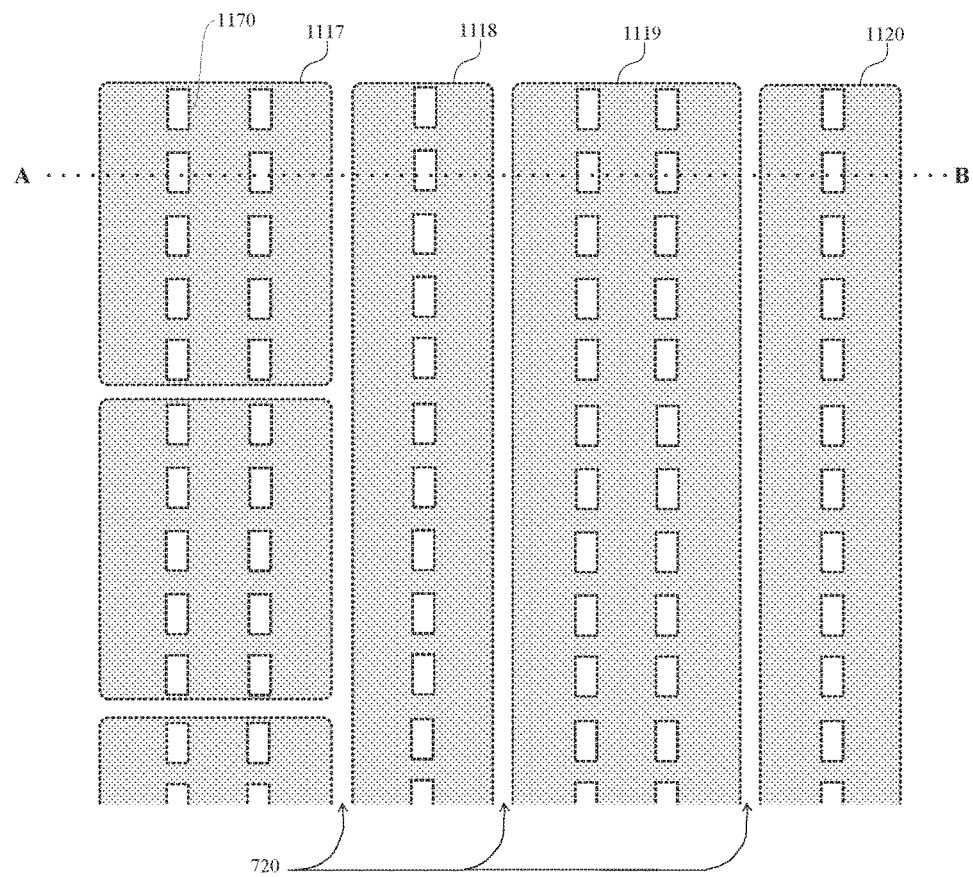
FIGS. 11A-11D illustrate an example touch screen configuration in which a Vcom layer is formed as to have holes or slits according to examples of the disclosure.
Figure 11B:
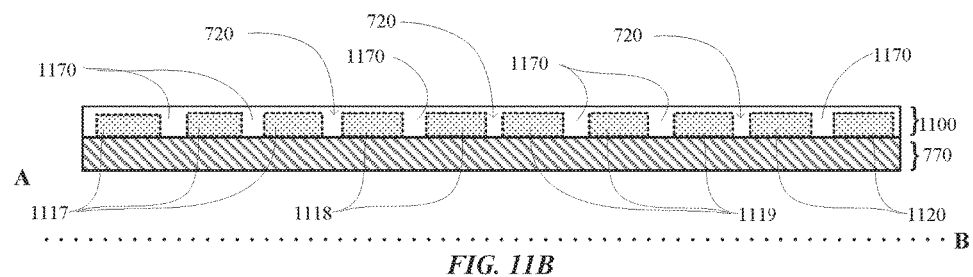

FIGS. 11A-11D relate to an example touch screen configuration in which a Vcom layer is formed as to have holes or slits according to examples of the disclosure. FIGS. 11A-11B illustrate a portion of a Vcom layer 1100 in an example configuration of touch screen 220 in which Vcom layer 1100 includes multiple slits 1170. FIG. 11A illustrates a plan view of the Vcom layer 1100, and FIG. 11B illustrates a cross-sectional illustration of the configuration shown in FIG. 11A across line A-B, as shown. In this example, the material and pattern of Vcom layer 1100 can be essentially the same as Vcom layer 700 explained with reference to FIGS. 7A-7B. However, unlike Vcom layer 700, the Vcom segments of Vcom layer 1100 can include multiple slits 1170. Vertical spacing between slits 1170 sharing a same Vcom segment can be large enough to maintain electrical connectivity between areas of the Vcom segment. In some configurations, slits 1170 can be spaced uniformly along the vertical length of the touch screen. As shown, in some examples, slits can be rectangular in shape and aligned vertically and horizontally. Moreover, slits 1170 (i.e., columns of slits) can spaced horizontally such that the collective horizontal spacing of both slits 1170 and gaps 720 is uniform. In some examples, slits 1170 can be formed as to have a same width as gaps 720. More generally, slits 1170 can be formed at areas of Vcom where supplementary-dummy features are also formed, as is explained with reference to FIGS. 11C-11D below.

Figure 11C:
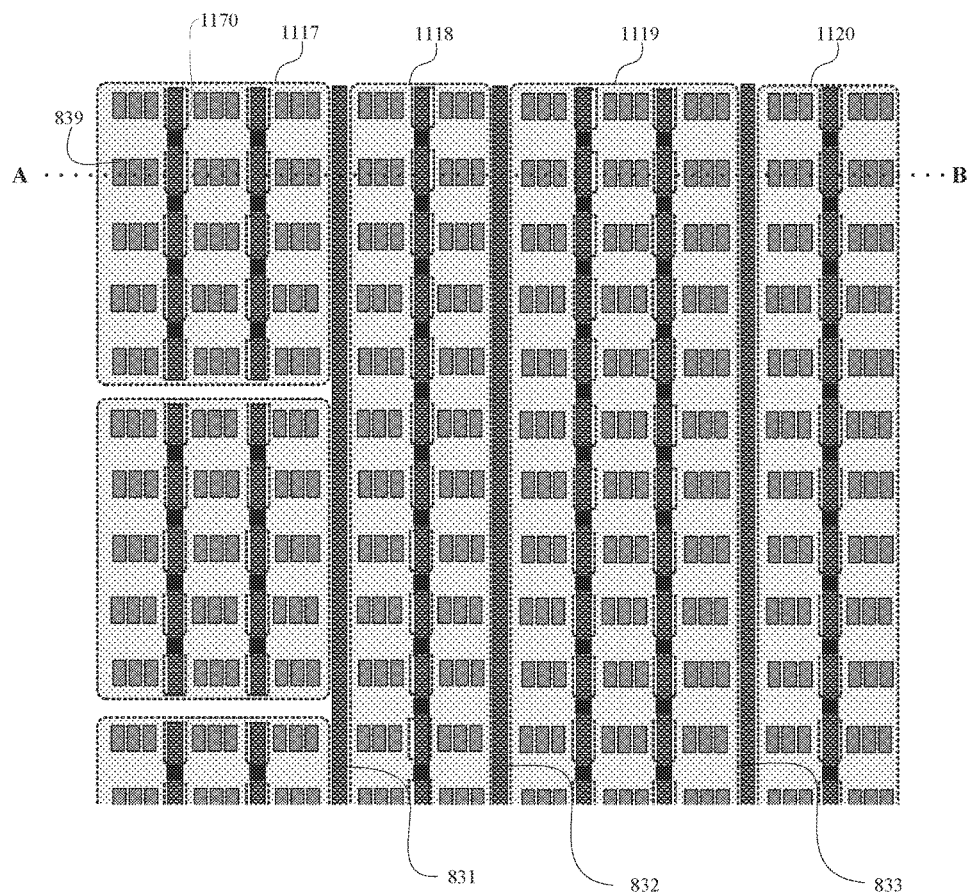
Figure 11D:
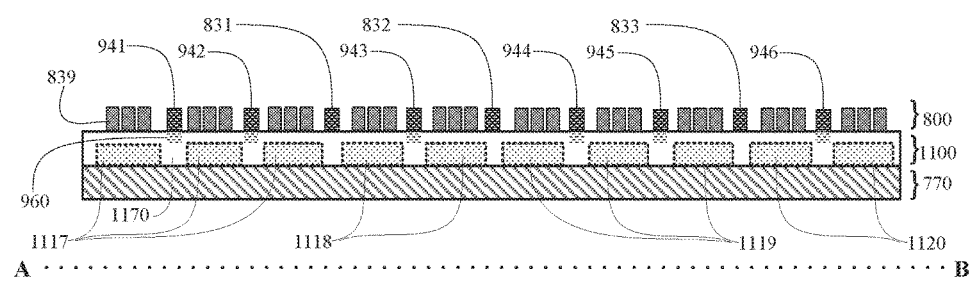

FIGS. 11D-11C illustrate the pixel layer 900 of the example configuration explained with reference to FIGS. 9A-9B above including pixel elements 839, primary-dummy features 831-833 and supplementary-dummy features 941-946. FIG. 11A illustrates a plan view of the pixel layer 900 and Vcom layer 1100, and FIG. 11B illustrates a symbolic cross-sectional illustration of the configuration shown in FIG. 11A across line A-B, as shown. Common electrodes 1101-1104 are illustrated with dashed lines to signify that these portions are formed on the Vcom layer 1100, which is separate from the pixel layer 900. As illustrated, slits 1170 can be generally formed at areas where supplementary-dummy features 941-946 are also formed. Therefore, as shown in FIG. 11D, both in areas where supplementary-dummy features 941-946 overlap with slits 1170, and in areas where primary-dummy features 831-833 overlap with gaps 720, a single layer of ITO is present. In some examples, this increased uniformity in transparency can improve the visual uniformity of the touch circuit.

As in the examples of FIGS. 9A-9B, supplementary-dummy features 941-946 can be coupled to the Vcom layer 1100 via one or more Vcom contact points 960. As shown in the example of FIG. 11C, contact points 960 can be positioned over common electrodes 1101-1104 such that each contact point 960 couples a supplementary-dummy feature to its corresponding electrode. In some configurations, contact points 960 can be positioned at vertical spaces between slits 1170.

Although the examples above describe slits 1170 in the context of the pixel layer 900 described with reference to FIGS. 9A-9B, it should be understood that slits can be used in any application in which supplementary-dummy features are formed over Vcom segments, according to examples of the disclosure. Similarly, it should be understood that the points 960 can be formed as to have a variety layout and electrical configurations as described above with reference to FIGS. 9A-9B.

Examples may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the elements to a particular direction or a particular coordinate system. Furthermore, although specific materials and types of materials may be included in the descriptions of examples, one skilled in the art will understand that other materials that achieve the same function can be used. For example, it should be understood that a "metal layer" as described in the examples below can be a layer of any electrically conductive material.

In accordance with the above, some examples of the disclosure are directed to a touch screen comprising: a plurality of common electrodes formed of a first conductive material; a plurality of dummy features, including: a set of primary-dummy features formed of a second conductive material, and a set of supplementary-dummy features formed of a third conductive material; wherein: at least one of the primary-dummy features is disposed so as to overlap with one or more gaps between the plurality of common electrodes, and at least one of the supplementary-dummy features is disposed so as to make a distance between one or more adjacent pairs of the plurality of dummy features equal in a first direction. Additionally or alternatively to one or more of the examples disclosed above, in some examples, the distance between the one or more adjacent pairs of the plurality of dummy features is less than a smallest distance between any of one or more immediately adjacent pairs of primary-dummy features in the first direction. Additionally or alternatively to one or more of the examples disclosed above, in some examples, the length of two or more of the set of supplementary-dummy features in a second direction, perpendicular to the first direction, is equal. Additionally or alternatively to one or more of the examples disclosed above, in some examples, a subset of the set of supplementary-dummy features are aligned in a second direction perpendicular to the first direction, and a distance in a second direction between one or more immediately adjacent pairs of the subset of supplementary-dummy features is equal. Additionally or alternatively to one or more of the examples disclosed above, in some examples, the distance in the second direction between the one or more adjacent pairs of the subset of supplementary-dummy features is the same as a distance between a pair of common electrodes immediately adjacent in the second direction. Additionally or alternatively to one or more of the examples disclosed above, in some examples, the subset of supplementary-dummy features are all located on a single common electrode and the subset of supplementary-dummy features includes multiple supplementary-dummy features. Additionally or alternatively to one or more of the examples disclosed above, in some examples, one or more of the supplementary-dummy features is coupled to one of the plurality of common electrodes. Additionally or alternatively to one or more of the examples disclosed above, in some examples, the set of primary-dummy features is coupled to one another in a border area of the touch screen. Additionally or alternatively to one or more of the examples disclosed above, in some examples, one or more of the set of primary-dummy features is coupled to a ground. Additionally or alternatively to one or more of the examples disclosed above, in some examples, one or more of the set of primary-dummy features is electrically floating. Additionally or alternatively to one or more of the examples disclosed above, in some examples, a first plurality of common electrodes form one or more drive lines and a second plurality of common electrodes form one or more sense lines. Additionally or alternatively to one or more of the examples disclosed above, in some examples, a first plurality of supplementary-dummy features are coupled to the one or more drive lines and a second plurality of supplementary-dummy features are coupled to the one or more sense lines. Additionally or alternatively to one or more of the examples disclosed above, in some examples, one or more common electrodes of the plurality of common electrodes includes a plurality of holes. Additionally or alternatively to one or more of the examples disclosed above, in some examples, one or more supplementary-dummy features of the set of supplementary-dummy features is disposed as to be over one or more of the plurality of holes. Additionally or alternatively to one or more of the examples disclosed above, in some examples, a pair of holes of the plurality of holes is separated in the first direction by a distance equal to the distance between the one or more adjacent pairs of the plurality of dummy features. Additionally or alternatively to one or more of the examples disclosed above, in some examples: the plurality of holes each have a rectangular shape and are formed as to each have a first width; the one or more gaps each have a second width; and the first width is equal to the second width. Additionally or alternatively to one or more of the examples disclosed above, in some examples, the touch screen further comprises a first common electrode, the first common electrode including a first and second hole of the plurality of holes, wherein: the first and second hole are aligned in a second direction orthogonal to the first; a first supplementary-dummy feature of the set of supplementary-dummy features is disposed over the first and second hole; and the first supplementary-dummy feature is coupled to the first common electrode at a location between the first and second hole. Additionally or alternatively to one or more of the examples disclosed above, in some examples, the first conductive material is the same as the second conductive material. Additionally or alternatively to one or more of the examples disclosed above, in some examples, the second conductive material is the same as the third conductive material. Additionally or alternatively to one or more of the examples disclosed above, in some examples, the touch screen further comprises a plurality of pixel electrodes formed of the second conductive material and on a same layer as the plurality of dummy features. Additionally or alternatively to one or more of the examples disclosed above, in some examples, the touch screen further comprises a plurality of common voltage lines formed of the second conductive material and on a same layer as the plurality of dummy features. Additionally or alternatively to one or more of the examples disclosed above, in some examples, the plurality of common electrodes are configured to operate as touch sensing elements during a touch sensing phase and to operate as elements of a display during a display phase.

Some examples of the disclosure are directed to a method of forming a touch screen, comprising: on a first layer, depositing a first conductive material to form a plurality of common electrodes; on a second layer, depositing a second conductive material to form a set of primary-dummy features; on the second layer, depositing a third conductive material to form a set of supplementary-dummy features parallel to the primary-dummy features; wherein: each of the primary-dummy features is disposed over one or more gaps between the plurality of common electrodes, and each of the supplementary-dummy features is disposed over at least a portion of the common electrodes. Additionally or alternatively to one or more of the examples disclosed above, in some examples, a smallest distance between any two immediately adjacent primary-dummy features is larger than a smallest distance between any two immediately adjacent primary-dummy features or supplementary-dummy features. Additionally or alternatively to one or more of the examples disclosed above, in some examples, depositing the third conductive material on the second layer includes forming two supplementary-dummy features, both of which at least partially overlap a same common electrode. Additionally or alternatively to one or more of the examples disclosed above, in some examples, the two supplementary-dummy features are parallel in a first direction and separated by a distance in a second direction, perpendicular to the first direction. Additionally or alternatively to one or more of the examples disclosed above, in some examples, the two supplementary-dummy features are aligned in a first direction along a length of the two supplementary-dummy features. Additionally or alternatively to one or more of the examples disclosed above, in some examples, one or more supplementary-dummy features are coupled to one or more common electrodes. Additionally or alternatively to one or more of the examples disclosed above, in some examples, the method further comprises, on the second layer, depositing the second conductive material to form one or more display pixel elements. Additionally or alternatively to one or more of the examples disclosed above, in some examples, the method further comprises, on the second layer, depositing the second conductive material to form one or more common voltage lines. Additionally or alternatively to one or more of the examples disclosed above, in some examples: the first conductive material is deposited such that one or more of the plurality of common electrodes each include a plurality of holes in the first conductive material; and one or more of the supplementary-dummy features is disposed over one or more of the plurality of holes. Additionally or alternatively to one or more of the examples disclosed above, in some examples, one or more of the plurality of holes is of a rectangular shape having a length and a width, the length running parallel to the supplementary-dummy features, and the width being equal to a width of each of the one or more gaps between the plurality of electrodes.

Although examples of this disclosure have been fully described with reference to the accompanying drawings, it is to be noted that various changes and modifications including, but not limited to, combining features of different examples, omitting a feature or features, etc., as will be apparent to those skilled in the art in light of the present description and figures.

The invention claimed is:

1. A touch screen comprising:
a plurality of common electrodes formed of a first conductive material;
a plurality of dummy features, including:
a set of primary-dummy features formed of a second conductive material, and
a set of supplementary-dummy features formed of a third conductive material;
wherein:
at least one of the primary-dummy features is disposed so as to overlap with one or more gaps between the plurality of common electrodes,
a width of the at least one of the primary-dummy features is substantially equal to a width of the one or more gaps with which the at least one of the primary-dummy features is disposed so as to overlap, and
at least one of the supplementary-dummy features is disposed so as to:
overlap with a common electrode of the plurality of common electrodes; and
make a distance between one or more adjacent pairs of the plurality of dummy features equal in a first direction.

2. The touch screen of claim 1, wherein the distance between the one or more adjacent pairs of the plurality of dummy features is less than a smallest distance between any of one or more immediately adjacent pairs of primary-dummy features in the first direction.

3. The touch screen of claim 1, wherein the length of two or more of the set of supplementary-dummy features in a second direction, perpendicular to the first direction, is equal.

4. The touch screen of claim 1, wherein a subset of the set of supplementary-dummy features are aligned in a second direction perpendicular to the first direction, and a distance in a second direction between one or more immediately adjacent pairs of the subset of supplementary-dummy features is equal.

5. The touch screen of claim 4, wherein the distance in the second direction between the one or more adjacent pairs of the subset of supplementary-dummy features is the same as a distance between a pair of common electrodes immediately adjacent in the second direction.

6. The touch screen of claim 4, wherein the subset of supplementary-dummy features are all located on a single common electrode and the subset of supplementary-dummy features includes multiple supplementary-dummy features.

7. The touch screen of claim 1, wherein one or more of the supplementary-dummy features is coupled to one of the plurality of common electrodes.

8. The touch screen of claim 1, wherein the set of primary-dummy features is coupled to one another in a border area of the touch screen.

9. The touch screen of claim 1, wherein one or more of the set of primary-dummy features is coupled to ground.

10. The touch screen of claim 1, wherein one or more of the set of primary-dummy features is electrically floating.

11. The touch screen of claim 1, wherein a first plurality of common electrodes form one or more drive lines and a second plurality of common electrodes form one or more sense lines.

12. The touch screen of claim 11, wherein a first plurality of supplementary-dummy features are coupled to the one or more drive lines and a second plurality of supplementary-dummy features are coupled to the one or more sense lines.

13. The touch screen of claim 1, wherein one or more common electrodes of the plurality of common electrodes includes a plurality of holes.

14. The touch screen of claim 13, wherein one or more supplementary-dummy features of the set of supplementary-dummy features is disposed as to be over one or more of the plurality of holes.

15. The touch screen of claim 13, wherein a pair of holes of the plurality of holes is separated in the first direction by a distance equal to the distance between the one or more adjacent pairs of the plurality of dummy features.

16. The touch screen of claim 13, wherein:
the plurality of:holes each have a rectangular shape and are formed as to each have a first width;
the one or more gaps each have a second width; and
the first width is equal to the second width.

17. The touch screen of claim 13, further comprising a first common electrode, the first common electrode including a first and second hole of the plurality of holes, wherein:
the first and second hole are aligned in a second direction orthogonal to the first;
a first supplementary-dummy feature of the set of supplementary-dummy features is disposed over the first and second hole; and
the first supplementary-dummy feature is coupled to the first common electrode at a location between the first and second hole.

18. The touch screen of claim 1, wherein the first conductive material is the same as the second conductive material.

19. The touch screen of claim 1, wherein the second conductive material is the same as the third conductive material.

20. The touch screen of claim 1 further comprising a plurality of pixel electrodes formed of the second conductive material and on a same layer as the plurality of dummy features.

21. The touch screen of claim 1 further comprising a plurality of common voltage lines formed of the second conductive material and on a same layer as the plurality of dummy features.

22. The touch screen of claim 1, wherein the plurality of common electrodes are configured to operate as touch sensing elements during a touch sensing phase and to operate as elements of a display during a display phase.

23. A method of forming a touch screen, comprising:
on a first layer, depositing a first conductive material to form a plurality of common electrodes;
on a second layer, depositing a second conductive material to form a set of primary-dummy features;
on the second layer, depositing a third conductive material to form a set of supplementary-dummy features parallel to the primary-dummy features;
wherein:

each of the primary-dummy features is disposed over one or more gaps between the plurality of common electrodes, a width of each of the primary-dummy features is substantially equal to a width of the one or more gaps over which the respective primary-dummy feature is disposed, and each of the supplementary-dummy features is disposed over at least a portion of the common electrodes.

24. The method of claim 23, wherein a smallest distance between any two immediately adjacent primary-dummy features is larger than a smallest distance between any two immediately adjacent features in an arrangement of primary-dummy and supplementary-dummy features.

25. The method of claim 23. wherein depositing the third conductive material on the second layer includes forming two supplementary-dummy features, both of which at least partially overlap a same common electrode.

26. The method of claim 25, wherein the two supplementary-dummy features are parallel in a first direction and separated by a distance in a second direction, perpendicular to the first direction.

27. The method of claim 25, wherein the two supplementary-dummy features are aligned in a first direction along a length of the two supplementary-dummy features.

28. The method of claim 23, wherein one or more supplementary-dummy features arc coupled to one or more common electrodes.

29. The method of claim 23, further comprising, on the second layer, depositing the second conductive material to form one or more display pixel elements.

30. The method of claim 23, further comprising, on the second layer, depositing the second conductive material to form one or more common voltage lines.

31. The method of claim 23, wherein:

the first conductive material is deposited such that one or more of the plurality of common electrodes each include a plurality of holes in the first conductive material; and one or more of the supplementary-dummy features is disposed over one or more of the plurality of holes.

32. The method of claim 31, wherein one or more of the plurality of holes is of a rectangular shape having a length and a width, the length running parallel to the supplementary-dummy features, and the width being equal to a width of each of the one or more gaps between the plurality of electrodes.

33. The method. of claim 23, wherein each of the supplementary-dummy features is disposed as to make a distance between any two immediately adjacent primary-dummy features or supplementary-dummy features equal in a first direction.

* * * * *